Jan. 3, 1956     E. A. NIELSEN ET AL     2,729,073
AIR EXPANSION REFRIGERATION SYSTEM
Filed July 27, 1953
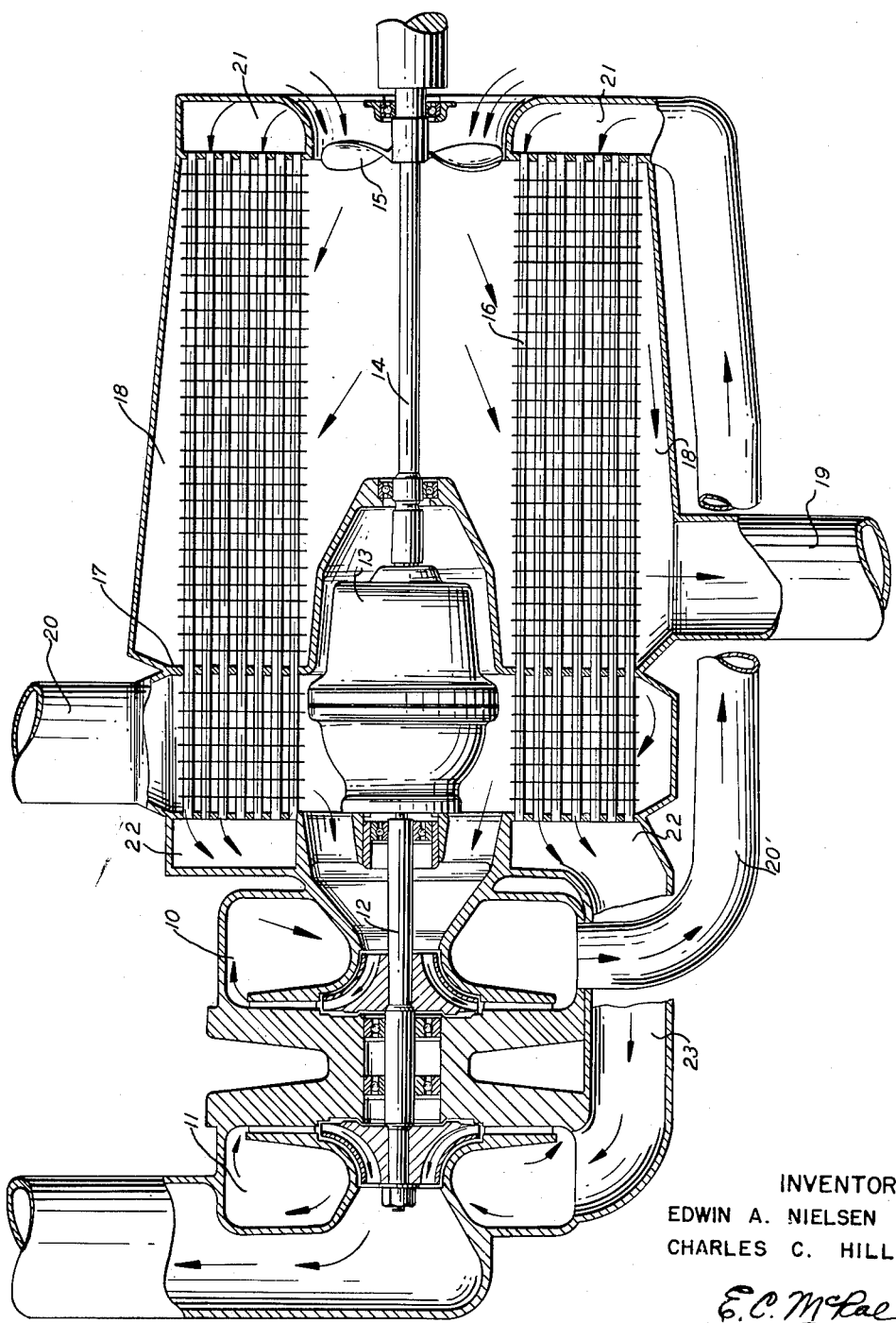
INVENTORS.
EDWIN A. NIELSEN
CHARLES C. HILL
BY
ATTORNEYS United States Patent Office 2,729,073
Patented Jan. 3, 1956

2,729,073
AIR EXPANSION REFRIGERATION SYSTEM

Edwin A. Nielsen, Dearborn, and Charles C. Hill, Oak Park, Mich., assignors to Ford Motor Company, Dearborn, Mich., a corporation of Delaware Application July 27, 1953, Serial No. 370,508

3 Claims. (Cl. 62—136)

This invention is concerned with the art of refrigeration broadly and more specifically with a small, compact, light-weight refrigeration system particularly adapted to mobile use such as automotive vehicles.

This system is a compression expansion refrigeration system in which the working fluid is air and in which heat is rejected to ambient air thus avoiding the use of toxic or expensive refrigerants and avoiding the necessity of supplying any cooling medium other than atmospheric air.

This invention is probably best understood by reference to the drawing which is an axial cross-section of a refrigeration system.

Referring to the drawing, the apparatus comprises broadly a turbo compressor 10 and a turbo expander 11, both being concentrically mounted upon and driven by shaft 12. Shaft 12 is driven through speed changer 13 which is in turn driven by shaft 14 upon which is mounted cooling air fan 15. Shaft 14 and cooling fan 15 may be driven from any convenient source such as an automobile engine, or an electric motor, or a separate internal combustion engine provided for this specific purpose. A suitable speed for shaft 14 would be about 6,000 R. P. M. and of shaft 12 about 48,000 R. P. M. Heat exchanger 16 has been provided in the form of an annular structure which is approximately coaxial with shaft 14. It will be noted that heat exchanger 16 is divided into two sections by bulkhead 17 for a purpose which will become apparent as the description proceeds.

In operation, fan 15 establishes a super-atmospheric or sub-atmospheric pressure in the annular space between shaft 14 and heat exchanger 16. This causes a radial outward flow of cooling ambient air through heat exchanger 16 into plenum 18 from which it is discharged to the atmosphere through conduit 19. Recirculated air from the space to be cooled enters the system through pipe 20 and flows inwardly and radially across heat exchanger 16. This air is discharged into the space surrounding shaft 12 and thence is conducted to turbo compressor 10 where it is compressed and of course heated. This compression will be essentially adiabatic in nature and hence a large amount of heat of compression must be dissipated. Accordingly the effluent from compressor 10 is led into conduit 20' and hence to plenum 21 which connects with one end of heat exchanger 16. The hot compressed air flows axially through heat exchanger 16 and is cooled first by ambient air and then by air being recirculated from the space being cooled. This cooled and compressed air is collected in manifold 22 and then is conducted through conduit 23 to turbo expander 11.

In turbo expander 11 the compressed and cooled air is expanded to approximately atmospheric pressure. This expansion will also be essentially adiabatic and will result in the air being substantially cooled. This cooled air is then available for the conditioning of any space it is desired to cool.

We claim as our invention:

1. A vehicular air conditioning apparatus comprising an inlet conduit leading from the space to be conditioned, an outlet conduit leading to the space to be conditioned, a cooling fan, a speed changer, a radial flow centrifugal compressor, a radial flow centrifugal expander and an annular heat exchanger, said cooling fan, compressor, expander and heat exchanger being arranged concentrically, a bulkhead dividing said heat exchanger into a first and second section, said first section being cooled by ambient air circulated by the cooling fan and said second section being connected to said inlet conduit and cooled by air recirculated through this conduit from the space to be cooled, and said centrifugal expander discharging expanded and cooled air into the outlet conduit and hence to the space to be cooled.

2. A vehicular air conditioning apparatus comprising an inlet conduit leading from the space to be conditioned, an outlet conduit leading to the space to be conditioned, a cooling fan, a speed changer, a radial flow centrifugal compressor, a radial flow centrifugal expander, an annular heat exchanger, and a bulk-head dividing said heat exchanger into a first and second section, said first section being cooled by ambient air circulated by the cooling fan, said second section forming a continuation of said inlet conduit and being cooled by air circulated through the inlet conduit from the space to be cooled, said cooling fan being driven at a comparatively low speed from an external source and said compressor and expander rotating at a much higher speed generated by the speed changer directly connected to said cooling fan, said centrifugal expander discharging expanded and cooled air through the outlet conduit into the space to be cooled.

3. A vehicular air conditioning apparatus comprising an inlet conduit leading from the space to be conditioned, an outlet conduit leading to the space to be conditioned, a cooling fan, a speed changer, a radial flow centrifugal compressor, a radial flow centrifugal expander, an annular heat exchanger, and a bulk-head dividing said heat exchanger into a first and second section, said first section being cooled by ambient air circulated by the cooling fan, said second section forming a continuation of said inlet conduit and being cooled by air circulated through the inlet conduit from the space to be cooled, said cooling fan being driven at a comparatively low speed from an external source and said compressor and expander rotating at a much higher speed generated by the speed changer directly connected to said cooling fan, said centrifugal expander discharging expanded and cooled air through the outlet conduit into the space to be cooled, said centrifugal compressor and expander being mounted on the same shaft whereby the work recovered by the expander serves to partially supply the necessary work to the compressor.

References Cited in the file of this patent

UNITED STATES PATENTS

| | | |
|---|---|---|
| 2,509,899 | Wood | May 30, 1950 |
| 2,557,101 | Mayer | June 19, 1951 |
| 2,632,307 | Massey | Mar. 24, 1953 |